(12) United States Patent
Redin et al.

(10) Patent No.: US 12,449,005 B2
(45) Date of Patent: Oct. 21, 2025

(54) COUPLING ASSEMBLY

(71) Applicant: Siemens Gamesa Renewable Energy Innovation & Technology S.L., Sarriguren (ES)

(72) Inventors: Juan Redin, San Jose, CA (US); Carlos Jesus Salvatierra Macua, Beriain (ES)

(73) Assignee: Siemens Gamesa Renewable Energy Innovation & Technology, S.L., Sarriguren (ES)

( * ) Notice: Subject to any disclaimer, the term of this patent is extended or adjusted under 35 U.S.C. 154(b) by 579 days.

(21) Appl. No.: 17/831,465

(22) Filed: Jun. 3, 2022

(65) Prior Publication Data
US 2022/0397158 A1 Dec. 15, 2022

(30) Foreign Application Priority Data
Jun. 14, 2021 (EP) .................................... 21382529

(51) Int. Cl.
*F16D 1/04* (2006.01)
*F03D 15/00* (2016.01)

(52) U.S. Cl.
CPC ............... *F16D 1/04* (2013.01); *F03D 15/00* (2016.05); *F05B 2260/402* (2013.01)

(58) Field of Classification Search
CPC . F03D 13/00; F03D 15/00; F16D 1/04; F16D 1/033; F16D 1/076; F16D 1/0835; F16D 1/0858; F16D 3/70; F05B 2260/402
See application file for complete search history.

(56) References Cited

U.S. PATENT DOCUMENTS

| | | | |
|---|---|---|---|
| 4,772,245 A | * | 9/1988 | Readman .................. F16D 3/76 464/89 |
| 9,771,924 B2 | * | 9/2017 | Demtröder .............. F03D 15/00 |
| 2012/0093578 A1 | | 4/2012 | Redin Miqueleiz |
| 2019/0024776 A1 | * | 1/2019 | Wilson .................. F16H 57/028 |
| 2019/0048938 A1 | | 2/2019 | Jens et al. |

FOREIGN PATENT DOCUMENTS

| | | |
|---|---|---|
| CN | 202048111 U | 11/2011 |
| CN | 205001428 U | 1/2016 |
| CN | 107165953 A | 9/2017 |
| CN | 206582251 U | 10/2017 |
| CN | 206738432 U | 12/2017 |
| CN | 112145566 A | 12/2020 |
| EP | 2435699 A2 | 4/2012 |
| EP | 3572637 A1 | 11/2019 |
| ES | 2387439 A1 | 9/2012 |
| JP | 2001214943 A | 8/2001 |
| WO | WO 2010136045 A2 | 12/2010 |

* cited by examiner

*Primary Examiner* — Nathaniel E Wiehe
*Assistant Examiner* — Maxime M Adjagbe

(57) ABSTRACT

A torque transmitting coupling assembly for a wind turbine configured to rotatably couple a first coupling part to a second coupling part, wherein the first coupling part and the second coupling part are configured to rotate about a longitudinal axis of the torque transmitting coupling assembly, wherein the torque transmitting coupling assembly includes a torque transmitting ring and a compression ring.

15 Claims, 7 Drawing Sheets

COUPLING ASSEMBLY

CROSS-REFERENCE TO RELATED APPLICATIONS

This application claims priority to EP Application No. 21382529.2, having a filing date of Jun. 14, 2021, the entire contents of which are hereby incorporated by reference.

FIELD OF TECHNOLOGY

The following relates to a torque transmitting coupling assembly for a wind turbine configured to rotatably couple a first coupling part to a second coupling part. The following further relates to a method for assembling a torque transmitting coupling assembly for coupling a first coupling part to a second coupling part.

BACKGROUND

Wind turbines are increasingly used for the generation of electrical energy. A wind turbine comprises a tower and a nacelle mounted on the tower, to which a hub is attached. A rotor is mounted at the hub and coupled to a generator. A plurality of blades extends from the rotor. The blades are oriented in such a way that wind passing over the blades turns the rotor, thereby driving the generator. Hence, the rotational energy of the blades is transferred to the generator, which then converts the mechanical energy into electricity and transfers the electricity to the electrical grid.

The drivetrain of a wind turbine comprises shaft-to-shaft or hub-to-shaft couplings to couple the components of the drivetrain. For example, the main shaft of the drivetrain between the main bearing and the gearbox is coupled to the gearbox input shaft or to the planet carrier of the gearbox to transfer the torque from the main shaft to the gearbox. The coupling has to be suitable to transfer the torques of the drivetrain of the wind turbine and not all couplings known from the conventional art, such as in the automotive sector, are suited for transferring the torques generated by a wind turbine.

Different shaft-to-shaft or hub-to-shaft couplings are known from the conventional art. For example, a shrink disk can be used for solid shaft arrangements. Alternatively, a bolted joint with friction shim can be used for the coupling. The use of a friction shim reduces the risk of slippage of the coupling members, as the friction shim increases the coefficient of static friction between the two coupled parts. For example, a coated steel shim with partially embedded diamonds can be used as a friction shim. The friction shim is then placed between the two coupling members of the shaft-to-shaft or hub-to-shaft couplings and the diamonds press into the surface of the coupling members to create a microform fit, which leads to a significant friction increase between the coupling members. The use of friction shims allows to transfer higher torques with less slippage risk and is a compact solution, however it is very expensive due to the materials used. Friction shims are used in the automotive sector to couple shafts of the drivetrain. However, the use of friction shims in wind turbines is very expensive, as the shafts have a much higher diameter and transferred torque compared to the automotive sector. Additionally, the disassembly of friction shims is difficult due to the microform fits. Alternatively, other frictional couplings such as clamping sets can be used, but their assembly and disassembly are difficult as well.

Torque transmitting couplings for wind turbines are known from the conventional art as well. Document US 2019/0048938 A1 discloses a torque transmitting coupling between two rotatable parts by means of a form-fitted coupling between the two rotatable parts and a compression ring which presses the two rotatable parts together. However, for this coupling, the second rotatable part is arranged at an outer circumferential surface of the first rotatable part. Hence, the second rotatable part is over-dimensioned so that the first rotatable part fits inside the second rotatable part at the coupling region. Additionally, the torque transmitting region of the coupling is limited by the overlapping surface of both rotatable parts.

The current development of the technology of wind turbines tends to an increased size of wind turbines for harvesting more wind energy, with longer blades and higher towers. Due to the increasing size of wind turbines and the higher loads generated by the wind turbines, higher torques are being transmitted by shafts and couplings in the drivetrain and shafts with a wider diameter are used.

Over-dimensioning coupling members for the torque transmitting coupling as disclosed in document US 2019/0048938 A1 is disadvantageous due to the increasing size of the drivetrain of newly developed wind turbines. The coupling technique of the drivetrain parts should not present a limiting factor in the dimensioning of the drivetrain components. In other words, the coupling should be adapted so as to present a compact solution to couple shafts or a shaft to a hub without having to modify the dimensions of the coupling members.

SUMMARY

An aspect relates to a torque transmitting coupling assembly which overcomes the problems known form the conventional art.

According to embodiments of the invention, the torque transmitting coupling assembly for a wind turbine is configured to rotatably couple a first coupling part to a second coupling part. The first coupling part and the second coupling part are therefore rotatable parts, such as a hub or a shaft.

According to embodiments of the invention, the first coupling part and the second coupling part are configured to rotate about a longitudinal axis of the torque transmitting coupling assembly. For example, if the first coupling part and the second coupling part are shafts, both shafts rotate about the longitudinal axis of the torque transmitting coupling assembly, which is the longitudinal axis of both shafts as well.

According to embodiments of the invention, the torque transmitting coupling assembly comprises a torque transmitting ring and a compression ring, wherein a first coupling surface of the first coupling part abuts against a third coupling surface of the torque transmitting ring, wherein a second coupling surface of the second coupling part abuts against a fourth coupling surface of the torque transmitting ring, wherein a torque is transferred in a torque transmitting region of the torque transmitting coupling assembly from the first coupling surface of the first coupling part to the third coupling surface of the torque transmitting ring and from the fourth coupling surface of the torque transmitting ring to the second coupling surface of the second coupling part. The torque transmitting region is a region in which torque is transferred from one component to another component.

Hence, the purpose of the torque transmitting ring is to transfer the torque between the first and the second coupling parts. For this, the torque transmitting ring is an intermediate component between the first and the second coupling parts in the torque path. The torque transmitting ring is coupled to both the first coupling part and the second coupling part.

According to embodiments of the invention, the compression ring is configured to press the torque transmitting ring against the first coupling part and/or the second coupling part. By pressing against the first coupling part and/or the second coupling part, the torque transmission between the first coupling part and the torque transmitting ring and/or between torque transmitting ring and the second coupling part is enhanced and slippage is avoided.

According to embodiments of the invention, the torque transmitting ring and the compression ring are located in the torque transmitting region. This allows for a compact arrangement of the torque transmitting coupling assembly.

According to an embodiment of the invention, the torque is transferred radially from the first coupling part to the torque transmitting ring, then axially within the torque transmitting ring and at last radially from the torque transmitting ring to the second coupling part.

Hence, neither the first nor the second coupling part need to be over-dimensioned for the coupling of both coupling parts with the torque transmitting ring. The radial and axial torque transferring allows to have the same diameter of the first and the second coupling part and be able to transfer the torque from the first coupling part to the second coupling part.

For example, the first and the second coupling part can be shafts with substantially the same outer diameter and the torque transmitting ring can be arranged over the outer diameter of both the first and the second coupling part so that the torque is first transferred radially from the first coupling part to the torque transmitting ring, then axially within the torque transmitting ring and at last radially from the torque transmitting ring to the second coupling part.

Alternatively, if the first and the second coupling part have a differing outer diameter, the thickness of the torque transmitting ring can vary to have contact with both the first and the second coupling part. Varying the thickness of the torque transmitting ring is a cheaper option than over-dimensioning the first or second coupling shaft.

The term radial torque transfer refers to a torque which is transferred substantially in a radial direction, hence from a first component to a second component located at a different radial distance from an axis than the first component or within a component in the radial direction.

Similarly, the term axial torque transfer refers to a torque which is transferred substantially parallel to the axis. The reference axis is the longitudinal axis of the torque transmitting coupling assembly.

According to another embodiment of the invention, the third coupling surface and the fourth coupling surface of the torque transmitting ring are adjacent to each other. For example, both the third coupling surface and the fourth coupling surface can be arranged at the inner surface of the torque transmitting ring. This allows for a compact arrangement of the torque transmitting coupling assembly.

According to another embodiment of the invention, the torque transmitting ring is loosely coupled to the first coupling part and/or to the second coupling part before the compression ring is installed. With a loose coupling it is meant that there is a tolerance between the third and fourth coupling surfaces of the torque transmitting ring and the first and second coupling surfaces of the first and second coupling parts respectively so that the torque transmitting ring does not lock the degrees of freedom of the alignment of the first and second coupling parts, thereby avoiding any concentricity misalignments caused by a rigid coupling. Once the torque transmitting ring is correctly placed, the compression ring can be installed, which locks the coupling and presses the third and fourth coupling surfaces of the torque transmitting ring against the first and second coupling surfaces of the first and second coupling parts respectively. At this point, the coupling is not loose anymore and there is no tolerance between the third and fourth coupling surfaces of the torque transmitting ring and the first and second coupling surfaces of the first and second coupling parts respectively due to the compression force exerted by the compression ring.

An advantage of a loose coupling between the torque transmitting ring and the first coupling part and the second coupling part is that tolerance errors of a form-fitted coupling can be compensated by the flexibility of the ring.

The torque transmitting ring is loosely coupled in the radial direction to the first coupling part and/or to the second coupling part before the compression ring is installed. This is particularly advantageous, as the compression ring presses the torque transmitting ring against the first coupling part and/or to the second coupling part in the radial direction relative to the longitudinal axis of the torque transmitting coupling assembly. Hence, the radially exerted compression force of the compression ring ensures that the radial tolerance between the torque transmitting ring and the first coupling part and/or to the second coupling part, which is advantageous for the assembly of the torque transmitting coupling assembly, is suppressed in the assembled state of the torque transmitting coupling assembly.

According to another embodiment of the invention, the torque transmitting ring is made of a rigid material, such as steel. Steel is up to a certain degree flexible and elastic so that the torque transmitting ring can be compressed by the compression ring in order to lock the torque transmitting ring to the first and second coupling parts. Additionally, a rigid material can transfer the torques of the drive train of wind turbines without getting damaged due to the rigidity of the material. A plastic such as polyamide can also be used as a rigid material.

According to another embodiment of the invention, the torque transmitting ring is made of an elastic material, such as rubber. An advantage of using an elastic material for the torque transmitting ring is that tolerance errors of the form-fitted coupling can be compensated by the flexibility and elasticity of the torque transmitting ring. However, the torque which can be transferred through such an elastic material without damaging the torque transmitting ring is lower than with a torque transmitting ring made of steel.

According to another embodiment of the invention, the torque transmitting ring is made of a rigid material with a coating from an elastic material, for example a steel ring with a rubber coating. This allows for a high torque transmission without damages to the torque transmitting ring and additionally, the elastic material is flexible to compensate for concentricity misalignments between the torque transmitting ring and the first and second coupling part.

According to another embodiment of the invention, the ring part of the torque transmitting ring is made of a rigid material and the third and fourth coupling surfaces are made of an elastic material.

According to another embodiment of the invention, the torque transmitting ring is arranged at an outer circumferential surface of the first coupling part.

By arranging the torque transmitting ring at the outer circumferential surface of the first coupling part, neither the first nor the second coupling part have to be over-dimensioned for the torque transmitting coupling assembly to transfer the torque from the first coupling part over the torque transmitting ring to the second coupling part. This is a major advantage compared to the techniques disclosed in the conventional art, where the second coupling part has to fit inside the first coupling part to transfer the torque radially from the first coupling part to the second coupling part.

Even if the coupling of the torque transmitting ring to the first coupling part comprises serrations, splines or teeth in which the torque is transferred within the coupling of both components through surfaces extending in axial and radial direction of the serrations, splines or teeth, the torque is transferred in a radial direction as the torque transmitting ring is arranged at the outer circumferential surface of the first coupling part. Hence, the torque transmitting ring is arranged radially outside the first coupling part.

According to another embodiment of the invention, the torque transmitting ring is arranged at an outer circumferential surface of the second coupling part. Hence, the torque is transferred in a radial direction from the torque transmitting ring to the second coupling part.

According to another embodiment of the invention, the torque transmitting ring is arranged at an outer circumferential surface of the first coupling part and at an outer circumferential surface of the second coupling part. Hence, the torque is first transferred radially outwards from the first coupling part to the torque transmitting ring, then axially within the torque transmitting ring and at last radially inwards from the torque transmitting ring to the second coupling part.

According to another embodiment of the invention, the compression ring is arranged at an outer circumferential surface of the torque transmitting ring. This allows for a compact arrangement of the torque transmitting coupling assembly. Additionally, the compression ring can shrink or press radially inwards so that it can press the torque transmitting ring against the first coupling part and/or the second coupling part.

According to another embodiment of the invention, the compression ring is of an elastic material and configured to be heated for sliding the compression ring on the outer circumferential surface of the torque transmitting ring. Hence, the compression ring can be heated for an easier sliding on top of the torque transmitting ring and, once it is arranged at the correct position, it cools down and compresses, thereby decreasing its diameter and pressing the torque transmitting ring against the first coupling part and/or the second coupling part. This avoids a loosening of the torque transmitting ring, supporting the correct placement of the torque transmitting ring and enhancing the torque transmission from the first coupling part to the torque transmitting ring and from the torque transmitting ring to the second coupling part.

According to another embodiment of the invention, the compression ring is of an elastic material, wherein the compression ring is expanded, for example by applying a radial force, to be able to mount the compression ring on the outer circumferential surface of the torque transmitting ring. Once it is mounted at the correct position, the compression ring is released so that it presses against the torque transmitting ring, thereby transferring a radial force and pressing the torque transmitting ring against the first coupling part and/or the second coupling part.

According to another embodiment of the invention, the compression ring is a shrink disc. The shrink disc acts as a compression coupling and applies a compression force to create a shear connection between the first coupling part and/or second coupling part on the one side and the torque transmitting ring on the other side. The shrink disc usually comprises one or two thrust rings with tapered bores and a mating tapered inner ring. By tightening locking screws, the thrust rings are drawn together compressing the inner ring and applying pretension to the torque transmitting ring to ensure a load distribution over all the coupling surfaces, for example over all the flanks of a form-fitted coupling.

According to another embodiment of the invention, the first coupling surface of the first coupling part is coupled to the third coupling surface of the torque transmitting ring by means of a first form-fitted coupling. Form-fitted couplings, such as keys, splines, serrations or polygon profiles, provide high torque transmitting capacity.

According to another embodiment of the invention, the second coupling surface of the second coupling part is coupled to the fourth coupling surface of the torque transmitting ring by means of a second form-fitted coupling.

According to another embodiment of the invention, the first form-fitted coupling comprises a serration assembly, wherein the first coupling surface of the first coupling part comprises a plurality of serration slopes, wherein the third coupling surface of the torque transmitting ring comprises a plurality of serration slopes configured to be engaged with the serration slopes of the first coupling surface.

For example, the plurality of serration slopes of the first coupling surface can be formed as peaks protruding from the first coupling surface and being configured to engage with grooves at the third coupling surface.

Alternatively, the plurality of serration slopes of the first coupling surface can be formed as grooves at the first coupling surface and being configured to engage with peaks protruding from the third coupling surface.

According to another embodiment of the invention, the second form-fitted comprises a serration assembly, wherein the second coupling surface of the second coupling part comprises a plurality of serration slopes, wherein the fourth coupling surface of the torque transmitting ring comprises a plurality of serration slopes configured to be engaged with the serration slopes of the second coupling surface.

For example, the plurality of serration slopes of the second coupling surface can be formed as peaks protruding from the second coupling surface and being configured to engage with grooves at the fourth coupling surface.

Alternatively, the plurality of serration slopes of the second coupling surface can be formed as grooves at the second coupling surface and being configured to engage with peaks protruding from the fourth coupling surface.

According to another embodiment of the invention, the first form-fitted coupling comprises a splined assembly, wherein the first coupling surface of the first coupling part comprises a plurality of splines, wherein the third coupling surface of the torque transmitting ring comprises a plurality of splines configured to be engaged with the splines of the first coupling surface.

According to another embodiment of the invention, the second form-fitted coupling between the second coupling part and the torque transmitting ring comprises a splined assembly, wherein the second coupling surface of the second coupling part comprises a plurality of splines, wherein the fourth coupling surface of the torque transmitting ring comprises a plurality of splines configured to be engaged with the splines of the second coupling surface.

According to another embodiment of the invention, the first form-fitted coupling comprises a drive flank assembly, wherein the first coupling surface of the first coupling part comprises a plurality of drive flanks, wherein the third coupling surface of the torque transmitting ring comprises a plurality of driven flanks configured to be engaged with the drive flanks of the first coupling surface. The thicker flanks of the drive flank assembly compared to serrations or splines have the advantage that higher torques can be transferred.

According to another embodiment of the invention, the second form-fitted coupling between the second coupling part and the torque transmitting ring comprises a drive flank assembly, wherein the second coupling surface of the second coupling part comprises a plurality of driven flanks, wherein the fourth coupling surface of the torque transmitting ring comprises a plurality of drive flanks configured to be engaged with the driven flanks of the second coupling surface.

According to another embodiment of the invention, a fastening means axially fixes the first coupling part and the second coupling part together. The fastening means can be a bolt, screw, pin, rivet, thread, stud or other longitudinal fastener used for fastening. The advantage of using a fastening means is that it provides an axial lock which fixes the first coupling part and the second coupling part together and reduces the risk a damage caused by bending of the torque transmitting coupling assembly. The bending moments are transferred directly through the fastening means axially and not through the torque transmitting coupling assembly.

Without a fastening means, the risk of transferring a bending moment through the torque transmitting coupling assembly is higher. A bending moment can result in a disengagement of the form-fitted coupling between the torque transmitting ring and the first and/or second coupling part and to damages in the torque transmitting coupling assembly.

The fastening means can also transfer a part of the torque from the first coupling part to the second coupling part, thereby allowing to transfer higher torques from the first coupling part to the second coupling part.

According to another embodiment of the invention, the torque transmitting coupling assembly further comprises an axial distance or separation between the first coupling part and the second coupling part. In an embodiment of the invention, no fastening means are used. Therefore, the torque is transmitted from the first coupling part to the second coupling part only by the torque transmitting ring. This has the advantage that misalignments at the first coupling part and at the coupling of the first coupling part to the torque transmitting ring are not transmitted to the second coupling part and vice versa, as the torque transmitting coupling assembly only locks the first coupling part and the second coupling part in the axial direction, allowing misalignments in the plane perpendicular to the axial direction. Shocks are also absorbed by this flexible coupling method, reducing the risk of damage to the components connected with the second coupling part.

According to another embodiment of the invention, a first compression ring presses the torque transmitting ring against the first coupling part and a second compression ring presses the torque transmitting ring against the second coupling part. The torque transmitting ring comprises a third coupling surface, a fourth coupling surface, and a fifth surface between the third coupling surface and the fourth coupling surface where torque is transmitted in the axial direction. This results in an axial distancing between the coupling of the first coupling surface of the first coupling part to the third coupling surface of the torque transmitting ring and the coupling of the fourth coupling surface of the torque transmitting ring to the second coupling surface of the second coupling part. The distancing allows for a flexible coupling of the torque transmitting coupling assembly, as the coupling allows for a certain degree of flexibility at the fifth surface, which can absorb bending moments and misalignments. The coupling of the first coupling surface of the first coupling part to the third coupling surface of the torque transmitting ring is compressed by the first compression ring. The coupling of the fourth coupling surface of the torque transmitting ring to the second coupling surface of the second coupling part is compressed by the second compression ring.

According to another embodiment of the invention, the fifth surface of the torque transmitting ring comprises at least partially a rigid material. This allows for the high torque transmission characteristic of wind turbine drive trains.

According to another embodiment of the invention, the fifth surface of the torque transmitting ring comprises at least partially an elastic material. This increases the flexibility of the torque transmitting ring and the capacity of the torque transmitting ring to absorb shocks, bending moments and misalignments, thereby avoiding the transfer of unwanted non-torque loads to the second coupling part and the parts connected to the second coupling part and avoiding a damage of these parts.

According to another embodiment of the invention, the torque transmitting ring comprises longitudinal grooves or windows. This increases the flexibility of the torque transmitting ring and the capacity of the torque transmitting ring to absorb shocks, bending moments and misalignments.

According to another embodiment of the invention, the first coupling part and the second coupling part are aligned by a removable alignment means before mounting the torque transmitting ring and the compression ring of the torque transmitting coupling assembly.

For the alignment of the first coupling part and the second coupling part, first the axis of both coupling parts are aligned. Then, an alignment means aligns the first coupling surface of the first coupling part to the second coupling surface of the second coupling part. Before installing the torque transmitting ring and therefore, before coupling the first coupling surface to the third coupling surface and the second coupling surface to the fourth coupling surface, the alignment means is removed and the angular position of the first coupling part in respect to the second coupling part is fixed by the fastening means, as there is some angular clearance between the insertion hole and the fastening means to allow for the alignment and the angular fixation.

If the coupling of the first coupling surface to the third coupling surface and the one of the second coupling surface to the fourth coupling surface is a form-fitted coupling comprising splines, serrations, or flanks, the alignment means can be a device such as a curved surface having the curvature of the outer diameter of the first and second coupling parts with a plurality of cylinders. The cylinders are then spaced at an angle corresponding to the angular spacing between the valleys of the splines, serrations, or flanks. The cylinders are then introduced in the valleys of the splines, serrations, or flanks of the second coupling part and shifted axially towards the first coupling part so that they are also introduced in the valleys of the splines, serrations, or flanks of the first coupling part, thereby aligning the valleys of the first coupling part and of the second coupling part. The alignment means is then removed and the alignment between the first and second coupling part is then fixed by the fastening means and the torque transmitting ring can then be slid over the first and second coupling parts and pressed against the first and second coupling parts by means of the compression ring.

In an embodiment, the alignment means comprises three cylinders.

In an embodiment, the cylinders of the alignment means are pins.

In an embodiment, the cylinders of the alignment means have a conical tip for enhancing the introduction of the cylinders in the valleys.

Alternatively, the torque transmitting ring can be used as the alignment means to align the first coupling surface of the first coupling part to the second coupling surface of the second coupling part. By directly installing the torque transmitting ring on the first and second coupling part, the torque transmitting ring aligns the coupling of the first coupling surface to the third coupling surface and of the second coupling surface to the fourth coupling surface.

According to another embodiment of the invention, both the third coupling surface and the fourth coupling surface can be arranged at the outer surface of the torque transmitting ring. Then, the first coupling surface of the first coupling part and the second coupling surface of the second coupling part are arranged at an inner surface of the first coupling part and at an inner surface of the second coupling part, respectively. In this case, the first coupling part and the second coupling part can be hollow shafts and the coupling is done at the inner radial part, i.e., the hollow part, of the shaft. The torque is then transferred radially inwards from the first coupling part to the torque transmitting ring, then axially within the torque transmitting ring and at last radially outwards from the torque transmitting ring to the second coupling part. For this configuration, the compression ring can be shrunk through cooling and inserted in the radially inner part of the torque transmitting ring and then, when it warms up to ambient temperature, it expands and presses the torque transmitting ring against the first coupling part and/or against the second coupling part.

According to another embodiment of the invention, the first coupling surface of the first coupling part is arranged at the outer surface of the first coupling part and the second coupling surface of the second coupling part is arranged at the inner surface of the second coupling part. Hence, the torque transmitting ring has the third coupling surface at the inner surface of the torque transmitting ring and the fourth coupling surface at an outer surface of the torque transmitting ring. The torque is then transferred radially outwards from the first coupling part to the torque transmitting ring, then axially within the torque transmitting ring and at last radially outwards from the torque transmitting ring to the second coupling part. In this configuration, a compression ring can be arranged at the outer surface of the torque transmitting ring in the region of torque transfer between the torque transmitting ring and the first coupling part. Additionally, a second compression ring can be arranged at the inner surface of the torque transmitting ring in the region of torque transfer between the torque transmitting ring and the second coupling part.

According to another embodiment of the invention, the first coupling surface of the first coupling part is arranged at the inner surface of the first coupling part and the second coupling surface of the second coupling part is arranged at the outer surface of the second coupling part. Hence, the torque transmitting ring has the third coupling surface at the outer surface of the torque transmitting ring and the fourth coupling surface at the inner surface of the torque transmitting ring. The torque is then transferred radially inwards from the first coupling part to the torque transmitting ring, then axially within the torque transmitting ring and at last radially inwards from the torque transmitting ring to the second coupling part. In this configuration, a compression ring can be arranged at the inner surface of the torque transmitting ring in the region of torque transfer between the torque transmitting ring and the first coupling part. Additionally, a second compression ring can be arranged at the outer surface of the torque transmitting ring in the region of torque transfer between the torque transmitting ring and the second coupling part.

Yet another aspect of embodiments of the invention relate to a method for assembling a torque transmitting coupling assembly for coupling a first coupling part to a second coupling part, wherein the first coupling part and the second coupling part are configured to rotate about a longitudinal axis of the torque transmitting coupling assembly, wherein the first coupling part comprises a first coupling surface at an outer circumferential surface of the first coupling part, wherein the second coupling part comprises a second coupling surface at an outer circumferential surface of the second coupling part, wherein the torque transmitting coupling assembly comprises a torque transmitting ring and a compression ring, wherein the torque transmitting ring comprises a third coupling surface and a fourth coupling surface at an inner circumferential surface of the torque transmitting ring, wherein the first coupling surface of the first coupling part is configured to be coupled to the third coupling surface of the torque transmitting ring by means of a first form-fitted coupling, wherein the second coupling surface of the second coupling part is configured to be coupled to the fourth coupling surface of the torque transmitting ring by means of a second form-fitted coupling, the method comprising the steps of aligning the first coupling part and the second coupling part by a removable alignment means, fixing the first coupling part and the second coupling part together by a fastening means, removing the alignment means, mounting the torque transmitting ring on the outer surface of the first coupling part and the second coupling part in such a way that the first coupling surface of the first coupling part engages with the third coupling surface of the torque transmitting ring by means of the first form-fitted coupling and that the second coupling surface (21) of the second coupling part engages with the fourth coupling surface of the torque transmitting ring by means of the second form-fitted coupling, and mounting the compression ring (5) on the outer surface of the torque transmitting ring (4).

BRIEF DESCRIPTION

Some of the embodiments will be described in detail, with reference to the following figures, wherein like designations denote like members, wherein.

DETAILED DESCRIPTION

Figure 1:
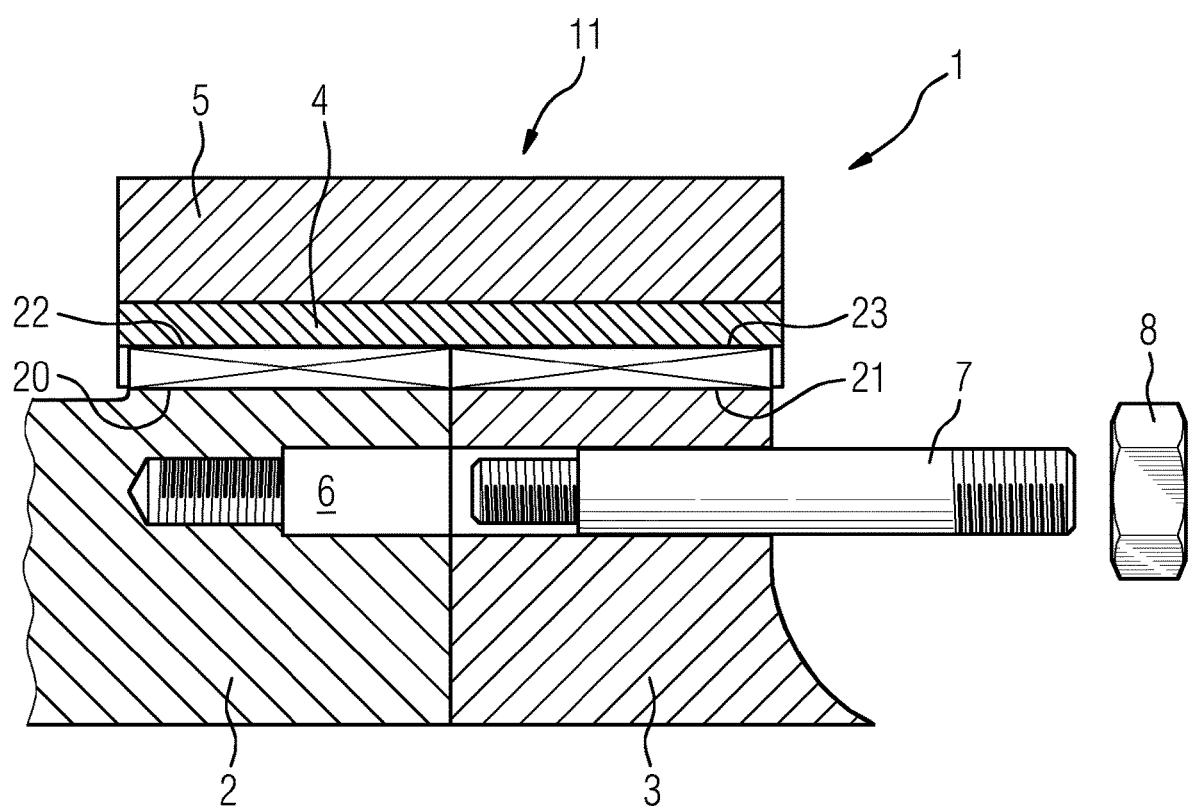
FIG. 1 shows a schematic view of a torque transmitting coupling assembly according to a first embodiment of the invention.

FIG. 1 shows a schematic view of a torque transmitting coupling assembly 1 according to a first embodiment of the invention. The torque transmitting coupling assembly 1 couples a first coupling part 2 to a second coupling part 3. The torque transmitting coupling assembly 1 comprises a torque transmitting ring 4 and a compression ring 5. A first coupling surface 20 of the first coupling part 2 abuts against a third coupling surface 22 of the torque transmitting ring 4. A second coupling surface 21 of the second coupling part 3 abuts against a fourth coupling surface 23 of the torque transmitting ring 4. A torque is transferred in a torque transmitting region 11 of the torque transmitting coupling assembly 1 from the first coupling surface 20 of the first coupling part 2 to the third coupling surface 22 of the torque transmitting ring 4 and from the fourth coupling surface 23 of the torque transmitting ring 4 to the second coupling surface 21 of the second coupling part 3. The compression ring 5 is configured to press the torque transmitting ring 4 against the first coupling part 2 and the second coupling part 3. The torque transmitting ring 4 and the compression ring 5 are located in the torque transmitting region 11.

In the embodiment shown here, the third coupling surface 22 and the fourth coupling surface 23 of the torque transmitting ring 4 are adjacent to each other. The torque transmitting ring 4 is arranged at an outer circumferential surface of the first coupling part 2 and at an outer circumferential surface of the second coupling part 2. The compression ring 5 is arranged at an outer circumferential surface of the torque transmitting ring 4.

A fastening means 7 is shown in this embodiment, which is configured to axially fix the first coupling part 2 and the second coupling part 3 together. The fastening means 7 is a stud which is inserted into a threaded insertion hole 6 and fastened to the first coupling part 2 and the second coupling part 3 by means of a nut 8. Alternatively, bolts can be used as fastening means 7, which do not need the installation of a nut 8.

Figure 2:
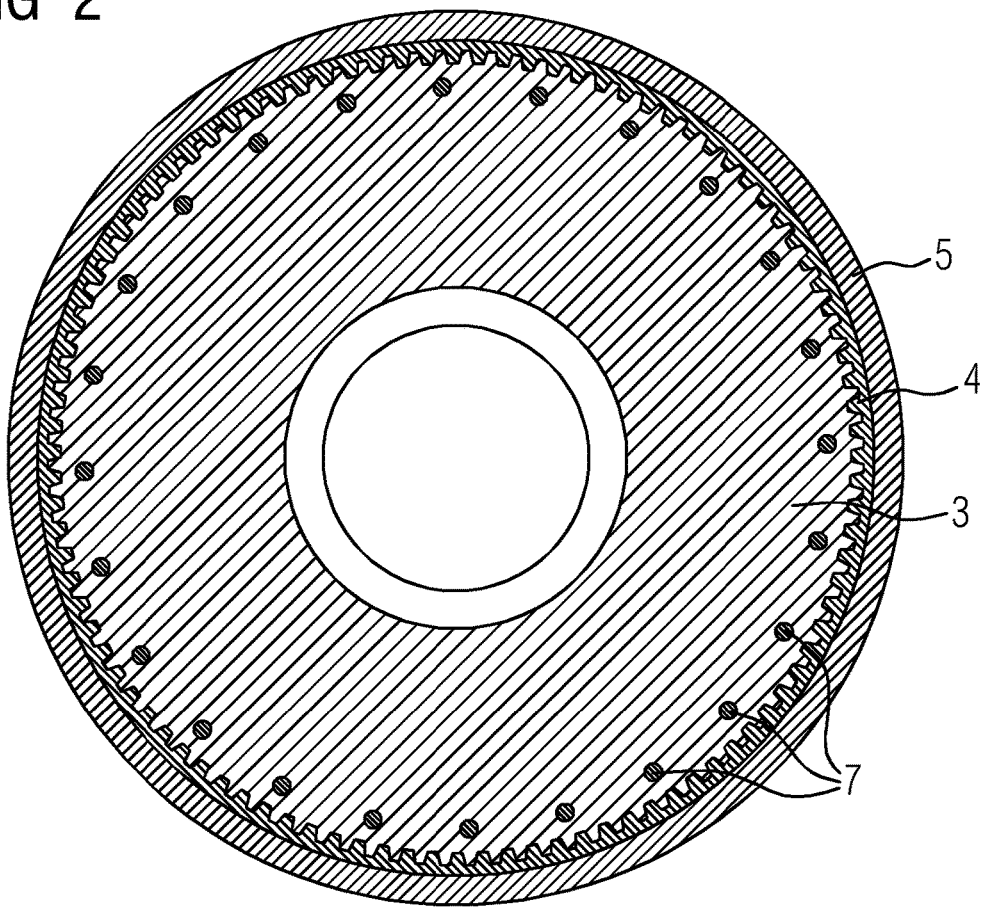
FIG. 2 shows a front view along the longitudinal axis of the torque transmitting coupling assembly according to the first embodiment of the invention.

FIG. 2 shows a front view along a longitudinal axis 10 of the torque transmitting coupling assembly 1 according to the first embodiment of the invention. The second coupling part 3 is coupled to the torque transmitting ring 4 by means of a second form-fitted coupling. The second coupling surface 21 of the second coupling part 3 comprises a plurality of splines, wherein the fourth coupling surface 23 of the torque transmitting ring 4 comprises a plurality of splines configured to be engaged with the splines of the second coupling surface 21. The compression ring 5 is configured to press the torque transmitting ring 4 against the second coupling part 3. A plurality of fastening means 7 fix the first coupling part 2 and the second coupling part 3 together.

Figure 3:
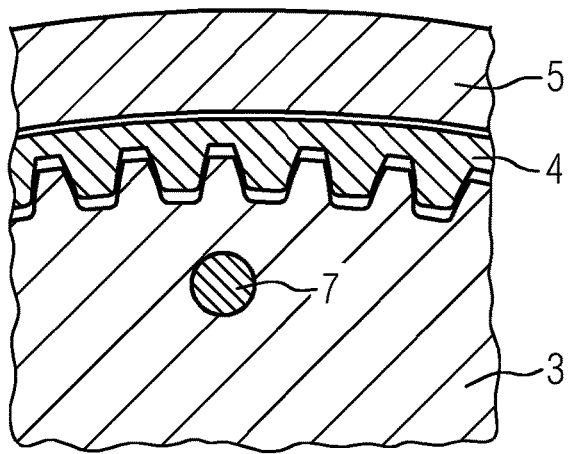
FIG. 3 shows the coupling of the second coupling part with the torque transmitting ring according to the first embodiment of the invention.
Figure 4:
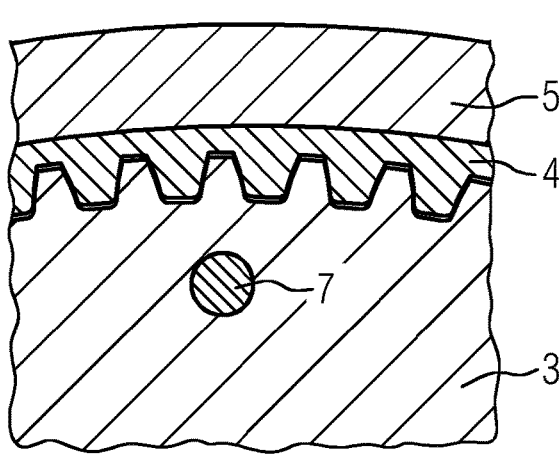
FIG. 4 shows the coupling of the second coupling part with the torque transmitting ring according to the first embodiment of the invention.

FIGS. 3 and 4 show the coupling of the second coupling part 3 with the torque transmitting ring 4 according to the first embodiment of the invention. The compression ring 5 is of an elastic material. The compression ring 5 is heated or a radial force is applied to the compression ring 5 to be able to mount the compression ring 5 on the outer circumferential surface of the torque transmitting ring 4.

In FIG. 3, the compression ring 5 is placed in the correct position, but due to the heating or to the radial force exerted on it, the compression ring 5 has not compressed yet, leaving a gap between the torque transmitting ring 4 and the compression ring 5. Therefore, there is some clearance as well between the second coupling part 3 and the torque transmitting ring 4 in the radial direction, as the compression ring 5 does not exert a radial force and therefore does not press the torque transmitting ring 4 against the second coupling part 3.

In FIG. 4, the compression ring 5 is exerting a radial force, for example because it has cooled down and shrank, against the torque transmitting ring 4, thereby pressing the torque transmitting ring 4 against the second coupling part 3. The contact between the torque transmitting ring 4 and the second coupling part 3 through which the torque is transmitted is achieved at the surface of the flanks of both matching coupling surfaces extending substantially in radial direction, as due to the rotating nature of the coupling parts the torque is transmitted in a tangential direction through these surfaces. To avoid an over-dimensioning of the torque transmitting coupling assembly 1 and to ease the assembly, axially extending surfaces such as the peaks and valleys of the flanks have a clearance to the matching coupling surfaces, as torque is not transmitted through these surfaces. Torque is not transmitted from the peak of the flanks of a coupling surface to a valley of the flanks of the matching coupling surface.

There is no clearance anymore between the second coupling part 3 and the torque transmitting ring 4 and the coupling assembly 1 is locked.

Figure 5:
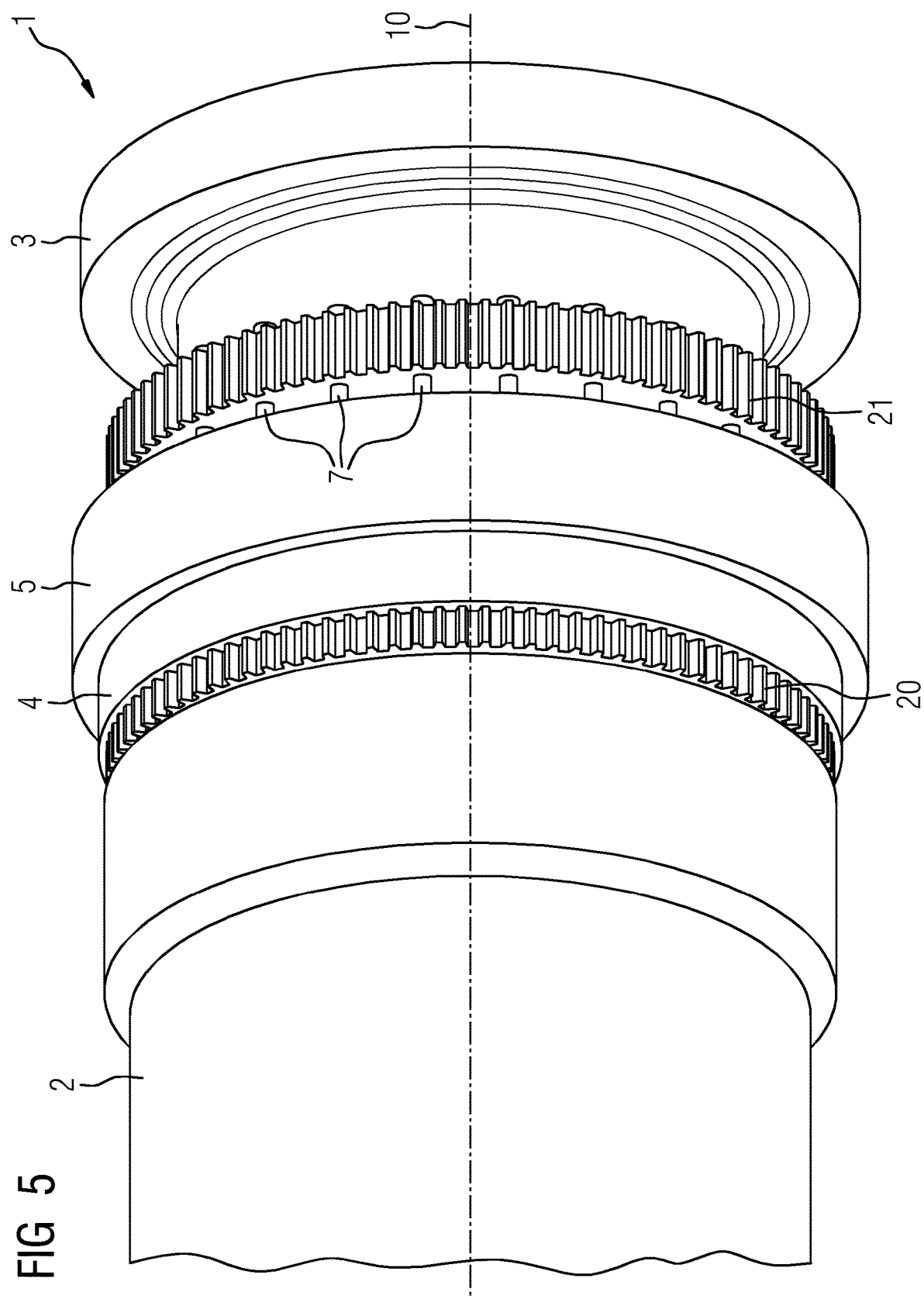
FIG. 5 shows an exploded view of the first and second coupling parts and of the torque transmitting coupling assembly according to the first embodiment of the invention.
Figure 6:
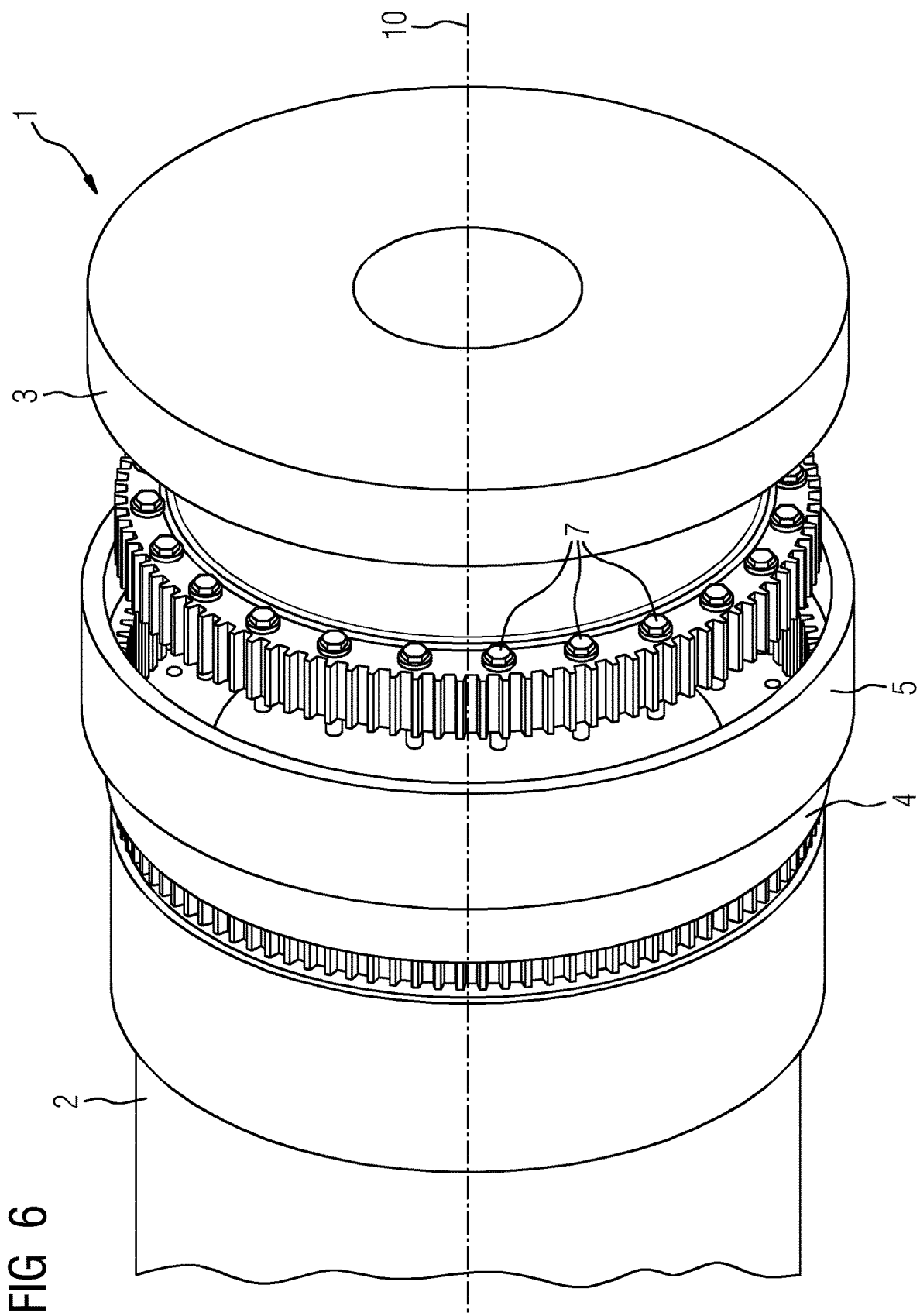
FIG. 6 shows an exploded view of the first and second coupling parts and of the torque transmitting coupling assembly according to the first embodiment of the invention.

FIGS. 5 and 6 show an exploded view of the first coupling part 2 and second coupling part 3 and of the torque transmitting coupling assembly 1 according to the first embodiment of the invention. The arrangement of the components is similar to the one shown in FIG. 1, with the torque transmitting ring 4 at the radial outer surface of the first and second coupling parts 2, 3 and with the compression ring 5 at the radial outer surface of the torque transmitting ring 4.

The first coupling part 2, the second coupling part 3 and the torque transmitting coupling assembly 1 rotate about the longitudinal axis 10.

The fastening means 7 can be bolts, which are pre-mounted at the second coupling part 3 during the manufacturing of the second coupling part 3 to reduce the installation time of the torque transmitting coupling assembly 1. Similarly, the fastening means 7 can be studs, which are be pre-mounted at the first coupling part 2 during the manufacturing of the first coupling part 2 to reduce the installation time of the torque transmitting coupling assembly 1.

Figure 7:
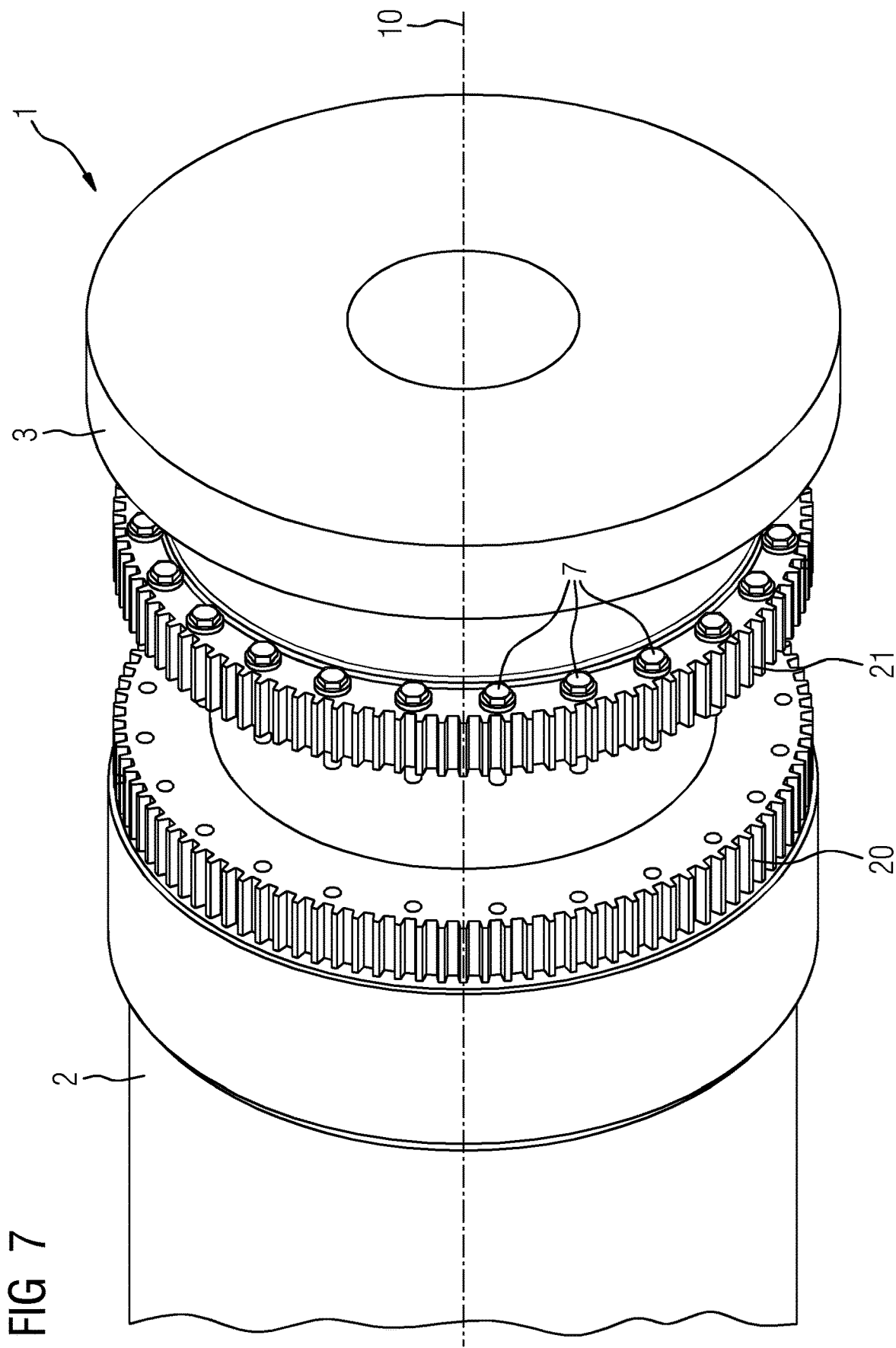
FIG. 7 shows an exploded view of the first and second coupling parts.

FIG. 7 shows an exploded view of the first coupling part 2 and the second coupling part 3. As can be seen from this figure, the first coupling part 2 comprises a first coupling surface 20 in the torque transmitting region 11 with splines configured to engage with splines of the third coupling surface 22 of the torque transmitting ring 4. Similarly, the second coupling part 3 comprises a second coupling surface 21 in the torque transmitting region 11 with splines configured to engage with splines of the fourth coupling surface 23 of the torque transmitting ring 4. As can be seen from the figure, the outer diameter of both the first coupling surface 20 and the second coupling surface 21 is similar. This is advantageous in terms of alignment of the form-fitted couplings of the first coupling part 2 and the second coupling part 3 and for the sliding of the torque transmitting ring 4 over the first and second coupling parts 2, 3.

Figure 8:
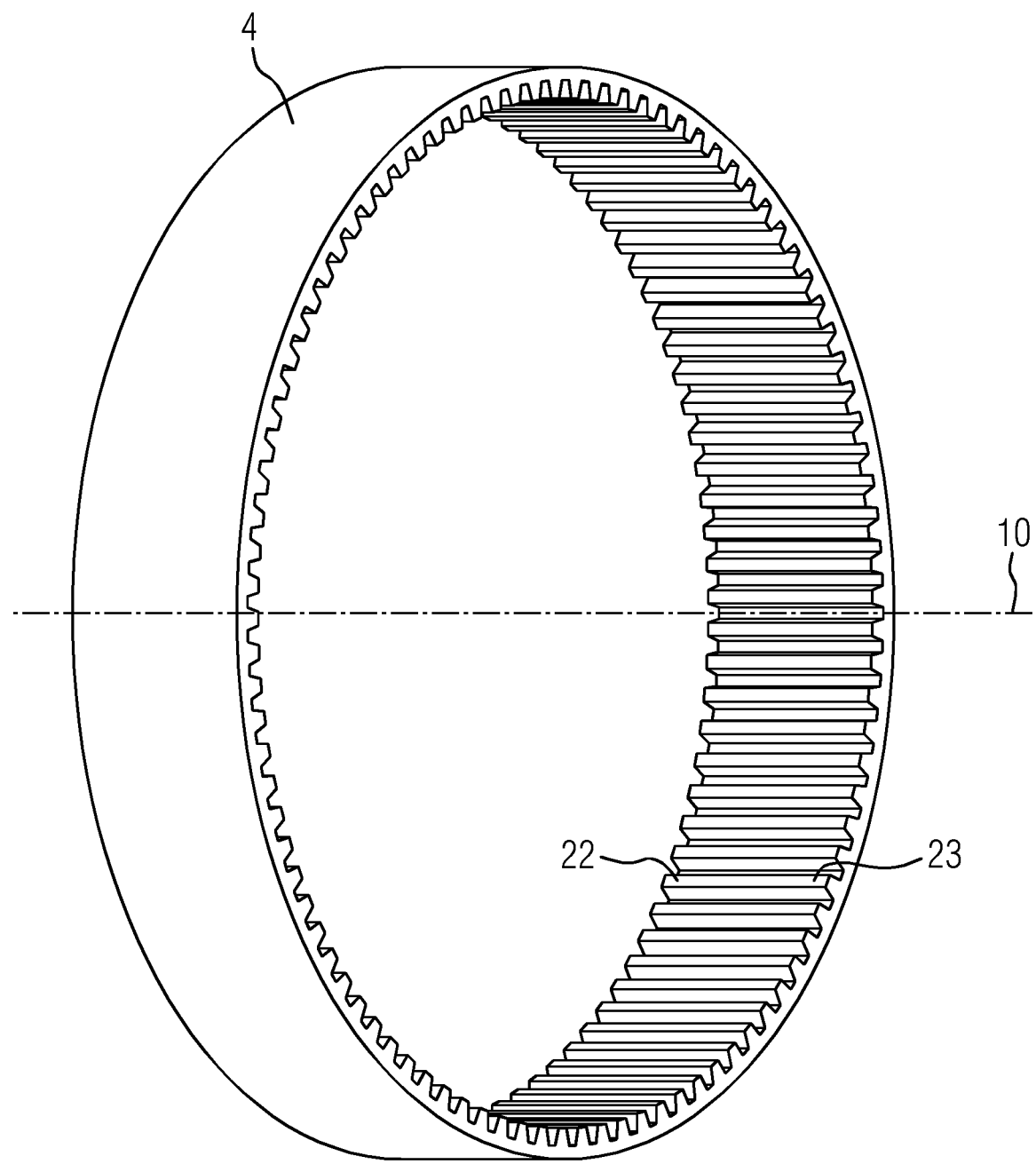
FIG. 8 shows the torque transmitting ring.

FIG. 8 shows the torque transmitting ring 4. The third coupling surface 22 and the fourth coupling surface 23 of the torque transmitting ring 4 are adjacent to each other and have the same inner diameter. This embodiment of the torque transmitting ring 4 can be slid on the first and second coupling parts 2, 3 having the same outer diameter at the first coupling surface 20 and the second coupling surface 21, as shown in FIG. 7.

Figure 9:
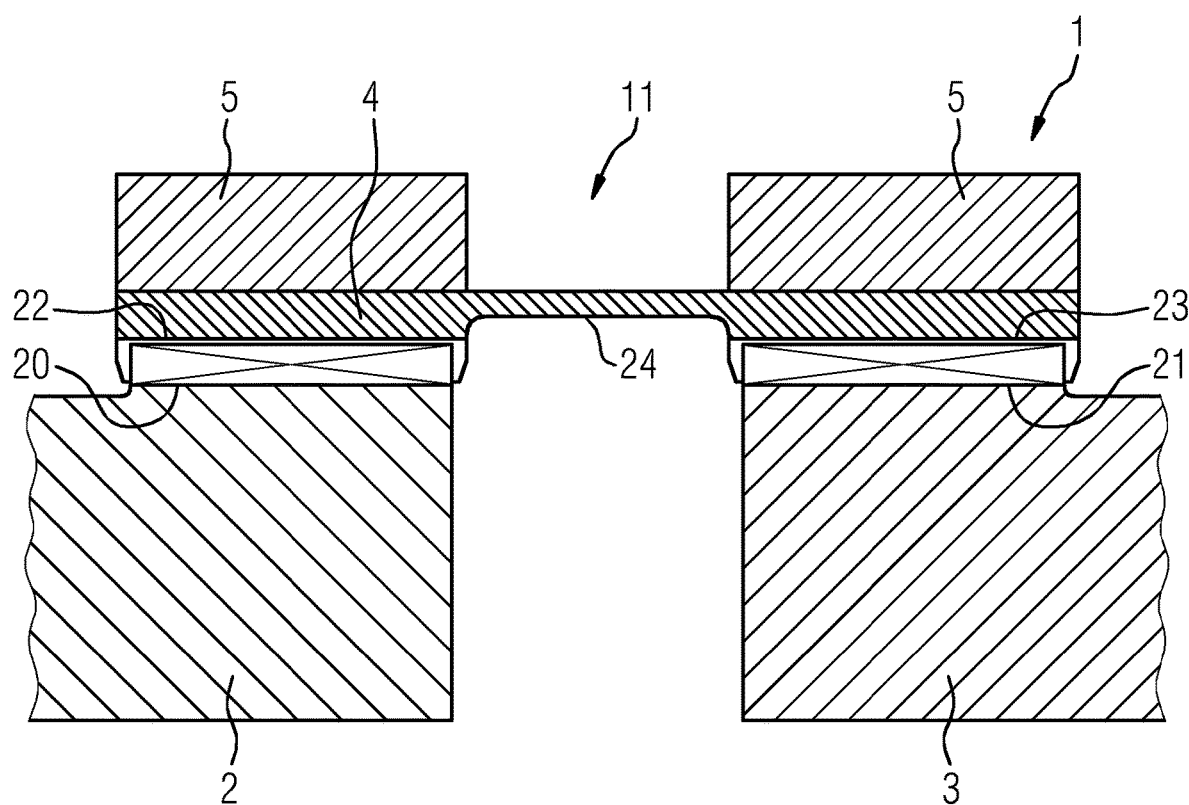
FIG. 9 shows a schematic view of a torque transmit-ting coupling assembly according to a second embodiment of the invention.

FIG. 9 shows a schematic view of a torque transmitting coupling assembly 1 according to a second embodiment of the invention. A first compression ring 5 presses the torque transmitting ring 4 against the first coupling part 2 and a second compression ring 5 presses the torque transmitting ring 4 against the second coupling part 3. The torque transmitting ring 4 comprises a third coupling surface 22, a fourth coupling surface 23, and a fifth surface 24 between the third coupling surface 22 and the fourth coupling surface 23 where torque is transmitted in the axial direction. This results in a distancing between the coupling of the first coupling surface 20 of the first coupling part 2 to the third coupling surface 22 of the torque transmitting ring 4 and the coupling of the fourth coupling surface 23 of the torque transmitting ring 4 to the second coupling surface 21 of the second coupling part 3. The distancing allows for a flexible coupling of the torque transmitting coupling assembly 1, as the coupling allows for a certain degree of flexibility at the fifth surface 24, which can absorb bending moments and misalignments. The coupling of the first coupling surface 20 of the first coupling part 2 to the third coupling surface 22 of the torque transmitting ring 4 is compressed by the first compression ring 5. The coupling of the fourth coupling surface 23 of the torque transmitting ring 4 to the second coupling surface 21 of the second coupling part 3 is compressed by the second compression ring 5.

Although the present invention has been disclosed in the form of embodiments and variations thereon, it will be understood that numerous additional modifications and variations could be made thereto without departing from the scope of the invention.

For the sake of clarity, it is to be understood that the use of "a" or "an" throughout this application does not exclude a plurality, and "comprising" does not exclude other steps or elements.

REFERENCE LIST

1 Torque transmitting coupling assembly
2 First coupling part
3 Second coupling part
4 Torque transmitting ring
5 Compression ring
6 Insertion hole
7 Fastening means
8 Nut
10 Longitudinal axis
11 Torque transmitting region
20 First coupling surface
21 Second coupling surface
22 Third coupling surface
23 Fourth coupling surface
24 Fifth surface

The invention claimed is:

1. A torque transmitting coupling assembly for a wind turbine configured to rotatably couple a first coupling part to a second coupling part, wherein the first coupling part and the second coupling part are configured to rotate about a longitudinal axis of the torque transmitting coupling assembly, the torque transmitting coupling assembly comprising:
   a torque transmitting ring and a compression ring, wherein a first coupling surface of the first coupling part abuts against a third coupling surface of the torque transmitting ring, and a second coupling surface of the second coupling part abuts against a fourth coupling surface of the torque transmitting ring;
   wherein a torque is transferred in a torque transmitting region of the torque transmitting coupling assembly from the first coupling surface of the first coupling part to the third coupling surface of the torque transmitting ring and from the fourth coupling surface of the torque transmitting ring to the second coupling surface of the second coupling part;
   wherein the torque transmitting ring and the compression ring are located in the torque transmitting region, and
   wherein the torque transmitting ring includes an axially-extending ring portion that defines a fifth surface that extends along the longitudinal axis between the first coupling part and the second coupling part,
   wherein the axially-extending ring portion is configured with a thinner cross-sectional profile relative to portions of the torque transmitting ring respectively spanned by the third coupling surface and the fourth coupling surface of the torque transmitting ring,
   wherein the axially-extending ring portion defines an axial spacing between 1) the first coupling surface of the first coupling part to the third coupling surface of the torque transmitting ring and 2) the second coupling surface of the second coupling part to the fourth coupling surface of the torque transmitting ring,
   wherein the axial spacing is chosen to provide a degree of flexibility by way of the axially-extending ring portion to absorb bending moments and/or misalignments,
   wherein the compression ring is formed by a first compression ring part arranged to press against the first coupling part and is further formed by a second compression ring part arranged to press against the second coupling part,
   wherein the first compression ring part and the second compression ring part are spaced apart from one another over the axial spacing.

2. The torque transmitting coupling assembly according to claim 1, wherein the third coupling surface and the fourth coupling surface of the torque transmitting ring are adjacent to each other.

3. The torque transmitting coupling assembly according to claim 1, wherein the torque transmitting ring is loosely coupled to the first coupling part and/or to the second coupling part before the compression ring is installed.

4. The torque transmitting coupling assembly according to claim 1, wherein the torque transmitting ring is arranged at an outer circumferential surface of the first coupling part and/or at an outer circumferential surface of the second coupling part.

5. The torque transmitting coupling assembly according to claim 1, wherein the compression ring is arranged at an outer circumferential surface of the torque transmitting ring.

6. The torque transmitting coupling assembly according to claim 5, wherein the compression ring is of an elastic material and slidable on the outer circumferential surface of the torque transmitting ring when the compression ring is subjected to heat and undergoes thermal expansion.

7. The torque transmitting coupling assembly according to claim 1, wherein the first coupling surface of the first coupling part is coupled to the third coupling surface of the torque transmitting ring by means of a first form-fitted coupling.

8. The torque transmitting coupling assembly according to claim 7, wherein the first form-fitted coupling comprises a serration assembly, wherein the first coupling surface of the first coupling part comprises a plurality of serration slopes, wherein the third coupling surface of the torque transmitting ring comprises a plurality of serration slopes configured to be engaged with the serration slopes of the first coupling surface.

9. The torque transmitting coupling assembly according to claim 7, wherein the first form-fitted coupling comprises a drive flank assembly, wherein the first coupling surface of the first coupling part comprises a plurality of drive flanks, wherein the third coupling surface of the torque transmitting ring comprises a plurality of driven flanks configured to be engaged with the drive flanks of the first coupling surface.

10. The torque transmitting coupling assembly according to claim 1, wherein the second coupling surface of the second coupling part is coupled to the fourth coupling surface of the torque transmitting ring by means of a second form-fitted coupling.

11. The torque transmitting coupling assembly according to claim 10, wherein the second form-fitted comprises a serration assembly, wherein the second coupling surface of the second coupling part comprises a plurality of serration slopes, wherein the fourth coupling surface of the torque transmitting ring comprises a plurality of serration slopes configured to be engaged with the serration slopes of the second coupling surface.

12. The torque transmitting coupling assembly according to claim 10, wherein the second form-fitted coupling between the second coupling part and the torque transmitting ring comprises a drive flank assembly, wherein the second coupling surface of the second coupling part comprises a plurality of driven flanks, wherein the fourth coupling surface of the torque transmitting ring comprises a plurality of drive flanks configured to be engaged with the driven flanks of the second coupling surface.

13. The torque transmitting coupling assembly according to claim 1, wherein a fastener axially fixes the first coupling part and the second coupling part together.

14. A method for assembling a torque transmitting coupling assembly for coupling a first coupling part to a second coupling part, wherein the first coupling part and the second coupling part are configured to rotate about a longitudinal axis of the torque transmitting coupling assembly, wherein the first coupling part comprises a first coupling surface at an outer circumferential surface of the first coupling part, the second coupling part comprises a second coupling surface at an outer circumferential surface of the second coupling part, wherein the torque transmitting coupling assembly comprises a torque transmitting ring and a compression ring, wherein the torque transmitting ring comprises a third coupling surface and a fourth coupling surface at an inner circumferential surface of the torque transmitting ring, wherein the first coupling surface of the first coupling part is configured to be coupled to the third coupling surface of the torque transmitting ring by means of a first form-fitted coupling, wherein the second coupling surface of the second coupling part is configured to be coupled to the fourth coupling surface of the torque transmitting ring by means of a second form-fitted coupling, the method comprising:
- aligning the first coupling part and the second coupling part;
- fixing the first coupling part and the second coupling part together by way of a fastener;
- mounting the torque transmitting ring on the outer surface of the first coupling part and the second coupling part in such a way that the first coupling surface of the first coupling part engages with the third coupling surface of the torque transmitting ring by means of the first form-fitted coupling and that the second coupling surface of the second coupling part engages with the fourth coupling surface of the torque transmitting ring by means of the second form-fitted coupling; and
- in the torque transmitting ring, providing an axially-extending ring portion that defines a fifth surface that extends along the longitudinal axis between the first coupling part and the second coupling part,
- configuring the axially-extending ring portion of the torque transmitting ring with a thinner cross-sectional profile relative to portions of the torque transmitting ring respectively spanned by the third coupling surface and the fourth coupling surface of the torque transmitting ring,
- the axially-extending ring portion of the torque transmitting ring, defining an axial spacing between 1) the first coupling surface of the first coupling part to the third coupling surface of the torque transmitting ring and 2) the second coupling surface of the second coupling part to the fourth coupling surface of the torque transmitting ring,
- choosing the axial spacing to provide a degree of flexibility by way of the axially-extending ring portion of the torque transmitting ring to absorb bending moments and/or misalignments, and
- forming the compression ring by a first compression ring part arranged to press against the first coupling part, and by a second compression ring part arranged to press against the second coupling part, wherein the first compression ring part and the second compression ring part are spaced apart from one another over the axial spacing.

15. The method of claim 14, further comprising aligning the first coupling part and the second coupling part by way of a removable device comprising cylinders or pins, wherein the aligning of the first coupling part and the second coupling part is carried out before mounting the torque transmitting ring and the compression ring of the torque transmitting coupling assembly.

* * * * *